Patented Oct. 30, 1945

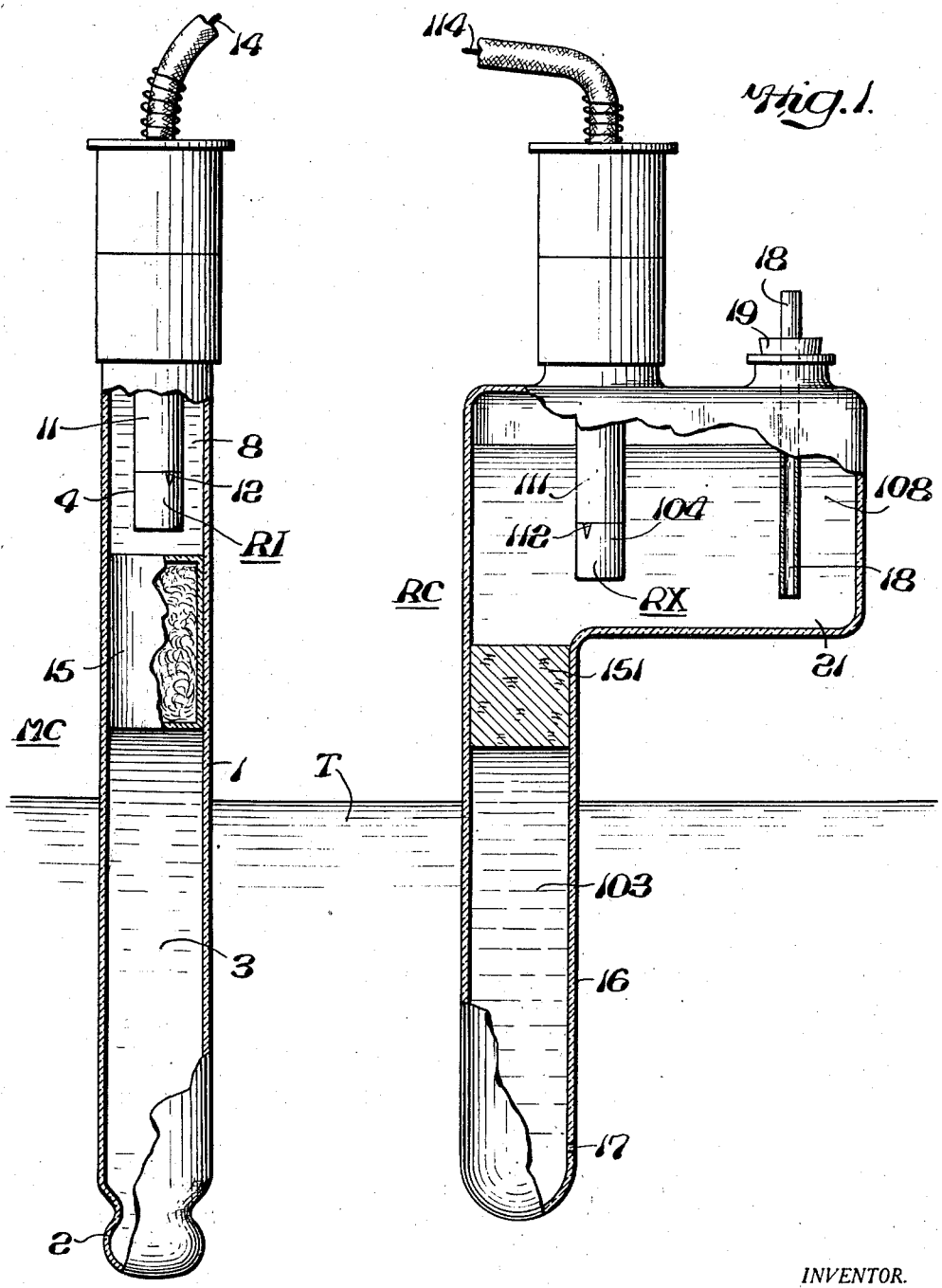

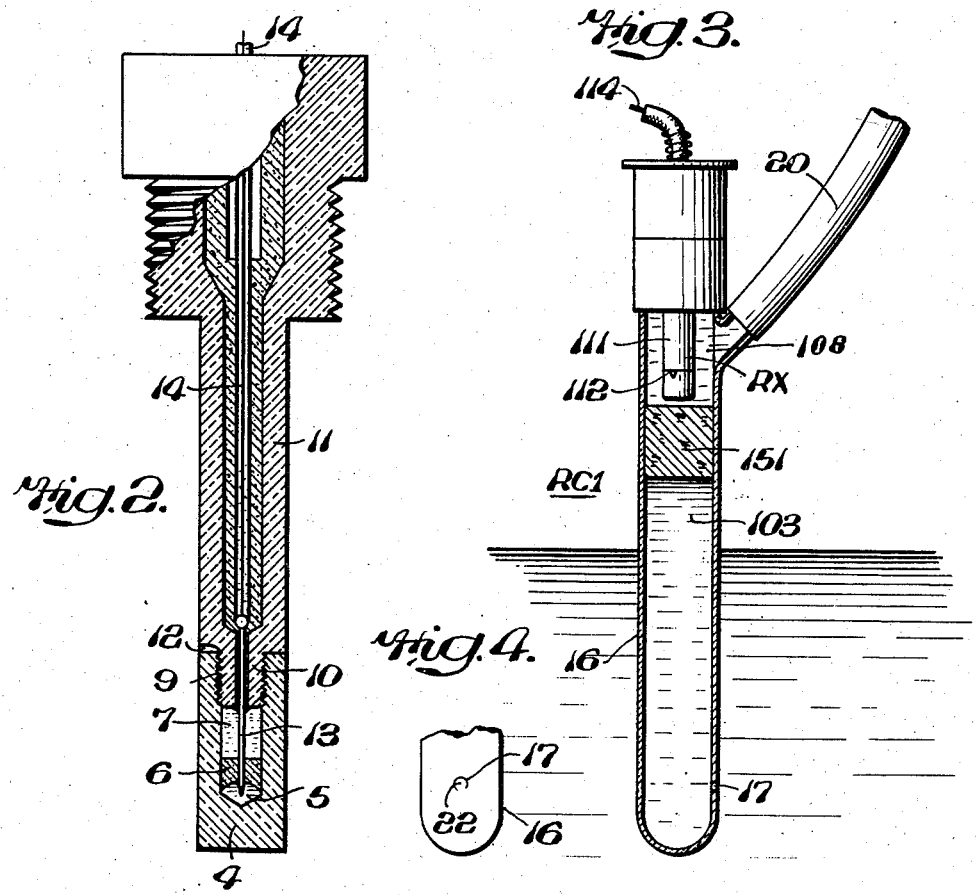
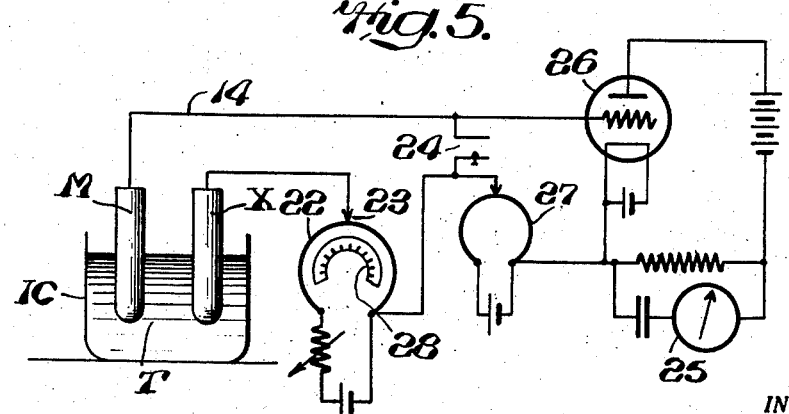

2,387,727

UNITED STATES PATENT OFFICE 2,387,727

HALF CELL WITH THERMAL BARRIER

James B. Godshalk, Philadelphia, Pa., assignor to Leeds & Northrup Company, Philadelphia, Pa., a corporation of Pennsylvania Application February 21, 1942, Serial No. 431,834

6 Claims. (Cl. 204—195)

My invention relates to electrodes constituting or comprised in half-cells used for example in measurement of concentrations of selected ions of solutions.

By thermally isolating an electrode from the test solution, by interposition of a barrier or plug of low thermal conductivity between a salt-bridge or buffer solution in heat transfer relation to the electrode and a salt-bridge or buffer solution in heat transfer relation to the test solution, I have found it possible accurately to measure the pH, hydrogen-ion concentration or hydroxyl-ion concentration, of test solutions while at temperatures substantially above 50° C., within a range including or extending substantially beyond 100° C.

More particularly and in accordance with one aspect of my invention, the "internal" reference electrode of a glass measuring electrode assembly is thermally isolated from the test solution, in contact with the outer active surface of the glass electrode, by a member or structure of glass, or equivalent, disposed within the assembly above the level of the test solution and serving to ensure or maintain a large difference between the temperatures of two bodies of buffer solution in electrical communication with each other and in both heat transfer and electrical conducting relations to the internal reference electrode and to the inner active surface of the glass electrode, respectively.

More particularly and in accordance with another aspect of my invention, an "external" reference electrode of a reference half-cell comprising it, is thermally isolated from the test solution by a member or structure of glass, or equivalent, disposed within the half-cell above the level of the test solution to provide a thermal barrier between two bodies of salt-bridge solution in both heat transfer and electrically conductive relations to the test solution and to the external reference electrode, respectively.

My invention further resides in the features of construction, combination and arrangement hereinafter described and claimed.

For an understanding of my invention and for illustration of several embodiments thereof reference is made to the accompanying drawings in which:

Fig. 1, partly in section, discloses elements of an ion-concentration cell.

Fig. 2, on enlarged scale and in section, discloses details of construction of electrodes appearing in Fig. 1.

Fig. 3 illustrates a modification of one of the half-cell assemblies of Fig. 1.

Fig. 4 is a fragmentary view referred to in explanation of the salt-bridge connection of Fig. 3.

Fig. 5 diagrammatically illustrates a measuring circuit.

Referring to Fig. 1, exemplary of a cell suitable for the determination of the concentration of hydrogen ions or hydroxyl ions in a solution, the measuring half-cell assembly MC comprises a tube 1 of suitable glass, or equivalent, to which is sealed, or which itself comprises, a glass membrane 2, usually substantially thinner than the wall of tube 1, constituting an electrode surface, in contact with the test solution T, at which there is produced a potential whose magnitude is a function of the pH (hydrogen ion concentration or the complementary hydroxyl ion concentration) of the solution T. For discussion of fundamental principles of operation of glass electrodes, reference is made to Clark's "The Determination of Hydrogen Ions" (pages 429 et seq. of the 3rd edition), published by The Williams & Wilkins Company of Baltimore, Md.

The body of liquid 3 within the chamber defined by the lower portion of the tube 1 and there in contact with the inner face of membrane 2, is any solution of known hydrogen ion concentration, stable or fixed throughout the range of temperatures of solution T; preferably it is a buffer solution of selected hydrogen-ion concentration, for example it may be a solution of potassium chloride and acid potassium phthalate prepared itself to have the desired pH value. The difference in potential of the opposite faces of glass membrane 2 is a function of the difference between the known, fixed hydrogen ion concentration of the buffer solution 3 and the unknown hydrogen ion concentration of the test solution T.

The "internal" reference electrode RI (so termed to distinguish it from the "external" reference electrode RX of the other half-cell RC) may be of any known type; for example, mercury/mercurous chloride (the so-called calomel electrode), silver/silver chloride, quinhydrone, or mercury/mercury perchlorate. A preferred construction for both of the reference electrodes RI and RX is shown in Fig. 2; for brevity, it is assumed each is of the aforesaid calomel type.

The cup 4 of insulating material, preferably "lucite," contains a layer of mercury 5 covered by a layer 6 of calomel paste comprising mercurous chloride and mercury; the space above the paste is filled with solution 7 of the same composition as solution 3 or 103; buffer solution when the electrode is an internal reference electrode; salt-bridge solution when the electrode is an external reference electrode. Electrical conduction between the body of solution 7 within electrode RI and the body of solution 8 of the same composition and external to electrode RI is afforded by the helical restricted passage 9 formed by the threads of cup 4 when it is screwed onto the threaded tip 10 of member 11 and by the notch 12 continuing therefrom in the upper edge of cap 4.

The conductor 13 of platinum, or equivalent, is cemented into the member 11 preferably also of "lucite," and is of length sufficient to extend into the mercury 5. To the upper end of conductor 13 is connected a conductor 14 which may be of less noble metal, for example copper, cemented into member 11 for connection of the half-cell MC to a measuring circuit of which Fig. 5 is exemplary.

The plug member 15 interposed between the two bodies 3 and 8 of solution in tube 1 is of composition substantially immune to physical or chemical effects of those solutions throughout a wide temperature range, for example from 0° to 100° C., so that it neither dissolves in nor reacts with them; the temperature coefficient of expansion of member 15 should be low to ensure constancy of its dimensions throughout aforesaid range of temperature. Member 15 must be of material which is a good insulator, electrically, to avoid production of extraneous or spurious potentials and to ensure all conduction between the bodies 3 and 8 of the buffer solution is by the liquid film around or through, or both, the plug 15; if the material is not itself porous, a capillary passage must be provided either through the plug or between it and the inside face of tube 1 or alternatively there may be provided a thin annular space between the plug and the tube which may be afforded, as hereinafter described, by the sliding fit between the plug and the tube.

In addition and of prime significance, the plug member 15 is of such construction or of such material that it serves greatly to hinder the transfer of heat between the bodies 3 and 8 of buffer solution in consequence of which, though the test solution T in which the assembly MC is immersed may be at elevated temperature, substantially above 50° C., the temperature of solution 8 in immediate heat-transfer relation with the internal reference electrode RI may not be more than a few degrees higher than room or ambient temperature and in any event substantially independent of the temperature of the test solution T. The bodies 3 and 8 of solution are in such proximate relation to each other that omission of plug 15, with its consequent replacement by solution, would cause such high conduction of heat between bodies 3 and 8 that variations in temperature of the test solution would seriously affect the potential of the reference electrode. The half-cell MC should not be so deeply immersed that the level of liquid T is above the level of the bottom of plug 15; otherwise effectiveness of the plug as a thermal barrier is to greater or less extent reduced and the temperature gradient between bodies 3 and 8 of buffer solution is correspondingly less steep.

Among materials suited for plug 15 are glass, cork, balsa, packed asbestos, heat-resistant wax such as "halowax," refractory brick, rubber, or heat-resistant plastic such as phenol formaldehyde, phenol furfural, urea melamine formaldehyde, vinylidene chloride, or methyl methacrylate. In general, the thermal conductivity as defined in Bureau of Standards letter circular No. 227 should be small and preferably less than 1.

Preferably, member 15, as shown in Fig. 1, is a hollow glass plug loosely filled with glass wool to reduce circulation of air within the plug and so reduce transfer of heat by convection currents. By way of example, it may be 1¾" long, ½" diameter (slidably to fit tube 2), wall thickness 1/25".

For measurement of pH, the glass electrode assembly MC may be used with any suitable known type of reference half-cell, for example, a mercury/mercury ion electrode, or a silver/silver chloride electrode. The external reference electrode may, as shown in Fig. 1, comprise electrode RX in construction similar to the internal reference electrode RI of the measuring electrode assembly MC; electrode RX is therefore not separately described; parts thereof corresponding with similar parts of electrode RI are identified by like reference characters increased by 100.

Preferably, and as shown in Fig. 1, the external reference electrode RX is thermally isolated from the test solution T by plug member 151 having generally the same characteristics concerning heat transfer, electrical conductivity, immunity to physical and chemical changes by solutions in contact therewith as plug member 15. The bodies 103 and 108 of liquid within the half-cell RC on opposite sides of member 151 are of suitable salt-bridge solution; for example, when the external reference electrode RX is of the calomel type, the bridge solution is of potassium chloride. Though the body 103 of bridge solution in the lower part of the half-cell RC is at substantially the same temperature as the test solution T, which as above stated may be substantially in excess of 50° C., the temperature of the body 108 of bridge solution in heat transfer relation with reference electrode RX is not more than a few degrees higher than room or ambient temperature because of the thermal isolation afforded by plug 151. For maximum effectiveness, the lower face of plug 151 should be above the level of test solution T.

Depending upon the material and construction of plug 151, electrical conduction between the two bodies of solution 103, 108 is afforded by a short, restricted liquid path through or about the plug 151.

The lower, tubular member 16 of half-cell RC is provided with a small passage or hole 17 through which the bridge solution 103 slowly diffuses; in replacement of this loss, additional solution very slowly flows, under constant pressure, from the upper body 108 of bridge solution through the restricted path through or about plug 151. The rate of flow may be very low, for example of the order of 1 cm.³ per 24 hours; the reservoir 21 of the reference half-cell RC therefore holds a quantity of salt-bridge solution sufficient, without addition thereto, for many weeks of operation. When necessary, fresh solution, or a different solution, may be introduced into the reservoir through the opening afforded by removal of stopper 19.

When plug 151 is of such material and construction that it tends to rise from its proper position, it should be restrained by a suitable stop provided for example by relocation of tube 18 of the constant head arrangement.

The modified form of external reference half-cell RC1 of Fig. 3 is in construction similar to cell RC of Fig. 1, except instead of itself comprising a reservoir for the salt-bridge solution, it is, above plug 151, formed with a T connection to receive a hose 20, of rubber or other suitable material, extending to a separate reservoir containing salt-bridge solution, for example potassium chloride.

Preferably in the external reference half cells of Figs. 1 and 3, instead of using a solution saturated at the temperature of the test solution, there is used a concentration corresponding to 28.13 grams of potassium chloride per 100 grams of water, which affords saturation at 0° C. corresponding with only about 50% saturation at 100° C. There is thus avoided junction errors at the diffusion opening 17, amounting in some cases to 1.0 pH or more, otherwise due to formation of a solid potassium chloride seal at the upper, cooler portion of the tube 16 with resultant diffusion of the test solution into the lower part of the tube.

In the case of both the internal and external reference electrodes, their thermal isolation, by member 15, 151, or equivalent, from the test solution T not only avoids errors of measurement directly affecting the reference electrode potential but also avoids disintegration and instability of the materials comprising the electrode. For example, the stability of mercurous chloride in contact with aqueous solutions of a given chloride ion concentration is poor at temperatures above 60° C.; mercury tends to form and mercuric chloride appears in the solution; the rate of this decomposition increases in the presence of potassium chloride or hydrochloric acid. Aforesaid thermal isolation of the reference half cells RI, RX prevents this disintegration and so ensures, as is necessary for proper functioning, an excess of mercurous chloride in contact with the mercury at all times.

The diffusion opening or salt-bridge connection 17 in the tubes 16 of the external reference electrodes of Figs. 1 and 3 may be, and preferably is, made by heating tube 16, preferably of Pyrex glass, to temperature sufficiently high to soften it. A hole punched in the hot tube by a suitable tool is filled with an insert of plug 22 Fig. 4, of lead glass, or equivalent, having a temperature co-efficient of expansion suitably greater than that of the glass comprising tube 16. This insert 22 fuses into the wall of tube 16 but as the tube cools to room temperature, a crack 17, reproducible for different tubes and inserts, appears extending through the wall of the tube and for a substantial fraction of the circumference of insert 22. This type of salt-bridge connection and the method of making it are described and claimed in Patent No. 2,345,498, March 28, 1944, to George A. Perley.

The voltage produced by a cell comprising any of the half-cells MC, RC, RCI and a second suitable half-cell, or comprising half-cell MC and either of half-cells RC, RCI may be measured by any suitable method; a suitable arrangement, shown in simplified form in Fig. 5, hereof, is disclosed and claimed in copending application of Wunsch Serial No. 258,140 filed February 24, 1939 upon which has issued Letters Patent No. 2,285,482; other are disclosed in co-pending application of Williams Serial No. 128,636 filed March 2, 1937, now Patent No. 2,312,945, granted March 2, 1943, and Letters Patent 2,108,294 to Doyle et al.

The cell IC, Fig. 5, into which the external reference electrode assembly X and the measuring electrode assembly M dip may be a cup into which from time to time are introduced relatively small samples of solution such as an industrial liquor at its process temperature, above for example 50° C.; when necessary or desirable, the cup may be heated to ensure the sample remains at that temperature during the measurement. Alternatively, the cell IC may comprise a flow channel, such as disclosed for example in aforesaid Letters Patent to Perley, through which flows, preferably continuously, a stream of the test solution at its elevated operating temperature; or where feasible, the two half-cells may be immersed, intermittently or continuously in an unsegregated body of the hot solution whose pH or other ionic characteristic is under measurement.

The voltage of the cell, in the case of the cell shown in Fig. 1, the algebraic sum of the potentials at the membrane 2, internal reference electrode RI, external reference electrode RX, and bridge connection 17, is balanced against the voltage-drop produced across a variable portion of potentiometer slidewire 22. When the slidewire contact 23 is in position effecting such balance, the opening and closure of switch 24 connected across the two sources of voltage, the cell IC and slidewire 22, have no effect upon galvanometer 25 or equivalent in the output circuit or system of an amplifier including thermionic tube 26.

The adjustment of the balancing potentiometer 22 and the adjustment of the zero-adjusting potentiometer 27, or equivalent, may be effected manually or, as disclosed in aforesaid Wunsch patent, automatically. At balance of the measuring network, the ion-concentration of test solution T may be read from the scale or chart generically indicated by scale 28 associated with the adjustable element, either the contact or the slidewire, of the potentiometer 22.

Without limitation thereto, the cells embodying my invention are suited to measurement of the pH of solutions involved in manufacture of cyanamid, explosives, or in refining of sugar throughout a range of temperatures extending substantially above 50° C. including 100°.

Except where so specified, the claims are not limited to measurement of hydrogen-ion concentration or hydroxyl ion-concentration, generically termed pH, but also include determinations of other ionic phenomena including oxidation-reduction.

What I claim is:

1. A half-cell for use in measuring pH of test solutions having temperatures in excess of about 50° C. comprising a receptacle for immersion in the test solution, a second receptacle proximate to and comprised in a unit with said first receptacle, a short passage connecting said receptacles, electrolyte solutions in said receptacles, a reference electrode in said second receptacle and in electrically conductive and heat transfer relations to the electrolyte therein, and a hollow glass plug slidably closely fitting said passage to provide a short restricted path for electrical conduction between the solutions in said receptacles and thermally to isolate them.

2. A half-cell for use in measuring pH of test solutions having temperatures in excess of about 50° C. comprising a receptacle for immersion in the test solution, a second receptacle proximate to and comprised in a unit with said first receptacle, a short passage connecting said receptacles, electrolyte solutions in said receptacles, a reference electrode in said second receptacle and in electrically conductive and heat transfer relations to the electrolyte therein, a hollow glass plug slidably closely fitting said passage to provide a short restricted path for electrical conduction between the solutions in said receptacles and thermally to isolate them, and a loose filling of glass wool in said hollow plug to minimize transfer of heat by convection currents.

3. A half-cell for determination of ionic characteristics of a test solution at a temperature in excess of 50° C. comprising a receptacle for partial immersion in the test solution, a body of electrolyte in one portion of said receptacle and partaking, through the wall of said receptacle, of a temperature approximately that of said solution, a second body of electrolyte in another portion of said receptacle, a reference electrode, whose potential is dependent upon its temperature, in electrically conductive connection with and in said second body of electrolyte, and means for maintaining the potential of said electrode substantially fixed, at a magnitude corresponding with a temperature substantially equal to the ambient temperature, irrespective of the temperature of said test solution comprising a plug of highly electrically and thermally insulating material closely fitting in said receptacle for separating said bodies of electrolyte and providing between its exterior and the wall of said receptacle a film of electrolyte as the only electrical connection between said bodies of electrolyte and substantially completely preventing heat-transfer from said first body of electrolyte to said reference electrode.

4. A half-cell for determination of ionic characteristics of a test solution, in accordance with claim 3, in which the plug is positioned in the receptacle above the first mentioned portion thereof.

5. A half-cell, in accordance with claim 3, in which the plug separating the bodies of electrolyte is hollow and closed adjacent its ends.

6. A half-cell, in accordance with claim 3, in which the plug separating the bodies of electrolyte is hollow, closed at its ends and contains glass wool.

JAMES B. GODSHALK.